United States Patent
Oberle et al.

(10) Patent No.: US 8,585,124 B2
(45) Date of Patent: Nov. 19, 2013

(54) DRIVE DEVICE OF A VEHICLE COMPONENT, IN PARTICULAR A BODY FLAP

(75) Inventors: Hans-Juergen Oberle, Rastatt (DE); Wilhelm Braun, Buehl (DE); Willi Schmidt, Stutensee-Buechig (DE); Siegfried Reichmann, Rheinau Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/384,290

(22) PCT Filed: Jul. 2, 2010

(86) PCT No.: PCT/EP2010/059427
§ 371 (c)(1),
(2), (4) Date: Apr. 2, 2012

(87) PCT Pub. No.: WO2011/006774
PCT Pub. Date: Jan. 20, 2011

(65) Prior Publication Data
US 2012/0187710 A1 Jul. 26, 2012

(30) Foreign Application Priority Data

Jul. 15, 2009 (DE) .......................... 10 2009 027 740
Nov. 25, 2009 (DE) .......................... 10 2009 047 130

(51) Int. Cl.
*B60J 5/10* (2006.01)

(52) U.S. Cl.
USPC ...................... 296/146.8; 296/106; 74/421 A

(58) Field of Classification Search
USPC ............... 296/146.8, 56, 57.1, 106; 74/421 A
See application file for complete search history.

(56) References Cited

U.S. PATENT DOCUMENTS

| | | | |
|---|---|---|---|
| 5,172,884 A | 12/1992 | Ishiyama | |
| 7,040,473 B2 | 5/2006 | Schachtl et al. | |
| 7,959,204 B2 * | 6/2011 | Yoshida | ........................ 296/56 |
| 2004/0097318 A1 | 5/2004 | Greuel et al. | |

OTHER PUBLICATIONS

PCT/EP2010/059427 International Search Report dated Sep. 17, 2010 (2 pages).

* cited by examiner

*Primary Examiner* — Dennis Pedder
(74) *Attorney, Agent, or Firm* — Michael Best & Friedrich LLP

(57) ABSTRACT

The invention relates to a drive device in vehicle component, comprising an electric drive motor, the armature shaft thereof being connected to a gearbox device for driving an output shaft. The gearbox device comprises at least one double gearbox unit, made of two gear stages having two changes in direction.

11 Claims, 1 Drawing Sheet

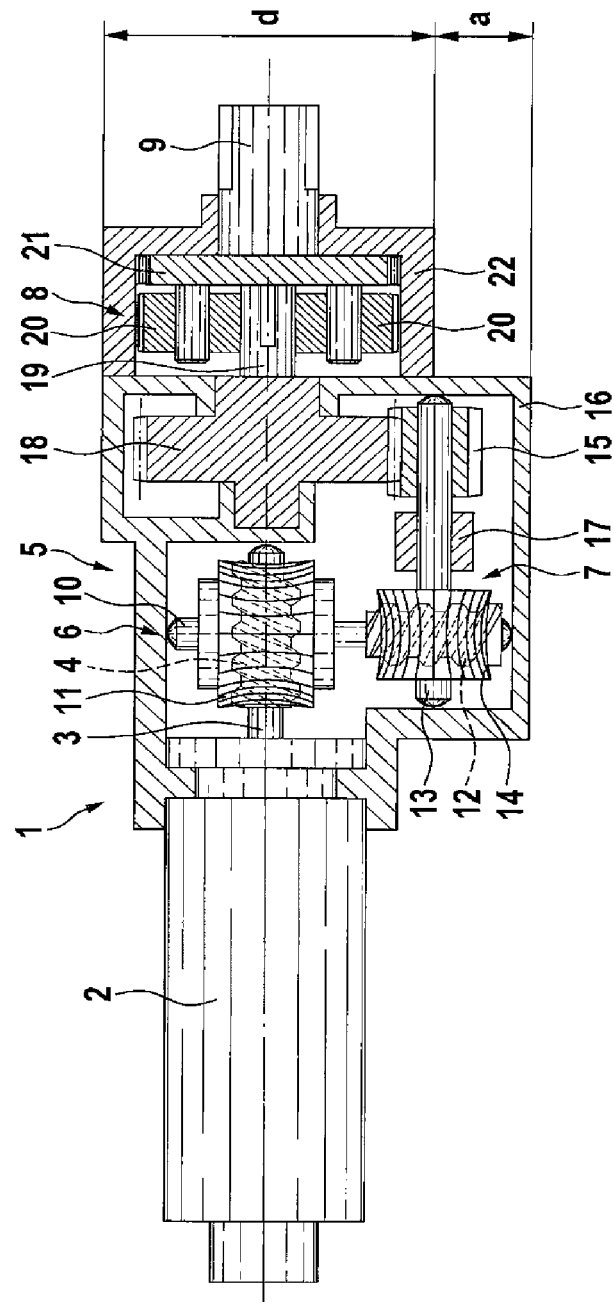

DRIVE DEVICE OF A VEHICLE COMPONENT, IN PARTICULAR A BODY FLAP

BACKGROUND OF THE INVENTION

The invention relates to a drive device of a vehicle component, in particular of a body flap such as, for example, a tailgate.

Electric tailgate drives, which comprise an electric drive motor and a planetary gear mechanism which is usually composed of a plurality of planetary stages for stepping down the drive speed, are known. The planetary gear mechanism is mounted axially upstream of the drive motor, which provides the advantage of a small diameter, with the result that only a relatively small installation space is necessary in the radial direction. However, planetary gear mechanisms have a relatively large number of components and require complex mounting. It is also disadvantageous that the first planetary stage on which the armature shaft of the electric drive motor acts rotates at a high rotational speed, which causes noise to be undesirably generated.

SUMMARY OF THE INVENTION

The invention is based on the object of specifying a compact and low-noise drive device of a vehicle component using simple measures.

The drive device according to the invention serves to drive a vehicle component, in particular a body component such as, for example, a tailgate, wherein the vehicle component can be adjusted between at least two positions—for example a closed position and an open position—by means of the drive device. The drive device can be activated electrically and comprises an electric drive motor and a transmission device for activating an output shaft, which adjusts the vehicle component, with the result that the transmission device converts the drive movement of the motor into an actuating movement in order to activate the vehicle component. For this purpose, the transmission device is coupled to the armature shaft of the electric drive motor, wherein the drive movement of the armature shaft is converted via the transmission into a drive movement of the output shaft, which acts on the vehicle component. Generally, the rotational speed is reduced from the armature shaft to the output shaft by means of the transmission.

According to the invention, the transmission device comprises at least one double transmission unit, composed of two transmission stages with two changes in direction. The direction of the drive movement from the armature shaft to the output shaft is deflection at two angles by means of the two transmission stages.

This embodiment has various advantages. Owing to the double deflection in the double transmission unit, it is possible to implement an embodiment which is relatively short in the axial direction, while maintaining the desired transmission down step. Despite the axially shortened embodiment, in the transverse direction and radial direction the embodiment is not larger, or is only slightly larger, than embodiments with multi-stage planetary gear mechanisms which are known from the prior art.

Basically, the transmission which is used as the double transmission unit can be one which is low in noise, has only a small number of components and has, in particular, at least one worm stage, preferably a double worm stage, which is embodied with two separate worm stages. A double change of direction can be implemented in a particularly easy way by means of the worm stage transmission. A double change of direction can be implemented in a particularly easy way by means of the worm stage transmission. At the same time, owing to the structurally simple embodiment with a relatively small number of moving components, low-noise operation is ensured. Due to their design, such worm drives have advantages over spur gear mechanisms in terms of the number of components and the generation of noise.

The at least one worm stage of the double transmission unit has, according to a further advantageous embodiment, a multi-turn worm with at least two turns, wherein, if appropriate, embodiments with more turns such as, for example, three, four or five turns, can also be considered. Since the pitch angle also increases as the number of turns increases, the effectiveness of the worm stage is improved. At the same time the breakaway torque, which is necessary to adjust the drive device manually, decreases. If the worm of the worm stage is provided with just one turn, self-locking occurs, which prevents manual activation. In contrast, in the case of multi-turn worms, a breakaway torque which brings about an adjustment of the drive device is applied manually. The breakaway torque exceeds the securing torque, which keeps the current position when the drive motor is not activated, even though the breakaway torque in the case of multi-turn worms is of an order of magnitude which can be applied manually. This has the advantage that, for example in the event of a failure of the electric drive motor, the relevant vehicle component can be adjusted by manual activation, which is not readily possible in the case of a single-turn worm of the worm stage owing to the self-locking. The multi-turn nature of the worm in the worm stage therefore ensures that in emergencies it is possible to intervene manually. It is therefore possible, for example in the case of installation of the drive device for a tailgate in a vehicle, to open and close the tailgate in the event of failure of the drive motor.

If both transmission stages of the double transmission unit are embodied as worm stages, the two worms of the worm stages are preferably each embodied in a multi-turn fashion with at least two turns, in order to avoid self-locking of the transmission. In this context, both embodiments in which the two worm stages have the same number of turns and embodiments with a different number of turns can be considered, provided that it is ensured that the two worm stages are embodied with at least two turns. As the number of turns increases, the efficiency of the worm stage is also improved, and accordingly the breakaway torque is reduced. The overall efficiency of the double worm drive is determined by multiplication of the individual efficiency levels of each worm stage.

If further transmission units in the drive device are also embodied as worm stages, they are also to be equipped with a turn number of at least two in order to prevent self-locking.

The change of direction in the double transmission unit with the two transmission stages can be implemented in various ways. According to a preferred embodiment there is provision that a 90° angular deflection is carried out in each transmission stage, with the result that the output shaft, on which the second transmission stage acts directly or indirectly and via which the actuating movement is transmitted to the vehicle component, is parallel with respect to the armature shaft of the electric drive motor. The dimensioning in the transmission stages is preferably selected in such a way that the output shaft is coaxial with respect to the armature shaft. The coaxial arrangement is advantageously brought about by means of an additional transmission stage which is arranged downstream and with which a further transmission down step can also be achieved.

The parallel and/or axial orientation of the armature shaft and output shaft can basically also be achieved by virtue of the fact that overall a corresponding deflection is implemented in the two transmission stages of the double transmission unit, wherein the deflection angle per transmission stage can also differ from 90°. Angular deflections in an angular range greater than 0° and less than 90° per transmission stage are therefore possible, with an overall deflection in which the input and the output of the double transmission unit are oriented in a parallel and, in particular, coaxial fashion with respect to one another being preferably set.

The embodiment of the double transmission unit as a worm drive has the advantage of a simpler structural design over planetary gear mechanisms. One shaft with, in each case, one worm which is arranged thereon so as to rotate therewith and a worm gear are usually provided for each worm stage, wherein the worm of the shaft of the first stage meshes with the worm gear of the shaft of the second stage. In the first stage, the shaft is driven on the input side by means of a worm gear, arranged there, of a worm which is connected to the armature shaft so as to rotate therewith, and the second stage is expediently coupled to a downstream transmission stage by means of a pinion which is securely connected to the second shaft.

According to a further advantageous embodiment, a spur gear stage is provided as a downstream transmission stage. Depending on the requirements made of the transmission and the torque, an additional downstream planetary gear mechanism can be provided with one or more planetary stages, wherein the planetary gear mechanism is driven by the output gear of the spur gear stage. Depending on the requirements, it is also conceivable to implement the output via the spur gear stage. Since the armature rotational speed has already been stepped down by means of the upstream double transmission unit, the input rotational speed at the planetary gear mechanism is reduced, with the result that there is no undesirably high level of noise generation at this point.

The pinion on the shaft of the second transmission stage expediently meshes with a spur gear, which is connected to the sun gear of the planetary gear mechanism so as to rotate therewith, which spur gear interacts with planetary gears of the planetary gear mechanism. The downstream spur gear mechanism has the further advantage that a coaxial arrangement can be brought about between the central rotational axis of the planetary gear mechanism and the rotational axis of the armature shaft.

On the output side, the planetary gear mechanism, in particular a planetary gear carrier which accommodates the planetary gears, is connected in a rotationally fixed fashion to the output shaft, which output shaft acts on the vehicle component which is to be activated.

According to one embodiment variant, the spur gear or output gear is connected to the planetary carrier, wherein the sun gear forms the output.

The double transmission unit advantageously has in the radial direction, that is to say viewed transversely with respect to the armature shaft, a protruding portion which, compared to a cylindrical outer face of the downstream transmission stage, is at maximum as large as the radius of the downstream transmission stage. In particular in the embodiment of the double transmission unit as a worm drive, the radial protruding portion does not extend over the entire circumference but rather only over a part or a segment thereof. The protruding portion is, if appropriate, significantly smaller than the radius of the downstream transmission stage, wherein, according to one particularly advantageous embodiment there is provision that the double transmission unit is completely within the cylindrical outer face of the downstream transmission stage.

If appropriate, it is also possible to dispense with the downstream transmission stage. Basically, an embodiment of the transmission device as a double transmission unit composed of two transmission stages with the direction being changed a total of two times, is sufficient.

If an additional transmission unit is arranged downstream, it can also be embodied as a worm drive in a further embodiment.

BRIEF DESCRIPTION OF THE DRAWINGS

FIG. 1 shows a drive device of a tailgate illustrated in section in a vehicle.

DETAILED DESCRIPTION

The drive device 1 illustrated in FIG. 1 comprises an electric drive motor 2, and also a double transmission unit 5 as a transmission device in a transmission casing 16, a spur gear stage with a pinion 15 and a spur gear or output gear 18, and a downstream planetary gear mechanism 8 for driving an output shaft 9. The armature shaft of the electric drive motor 2 is provided with a worm 4 which is secured so as to rotate with the latter and drives a first transmission stage 6 of the double transmission unit 5, wherein the double transmission unit 5 has, in addition to the first transmission stage 6, a second transmission stage 7 which is located in the transmission path between the first transmission stage 6 and the planetary gear mechanism 8. The kinematic transmission path is therefore as follows: armature shaft 3 with worm 4—first transmission stage 6—second transmission stage 7—planetary gear mechanism 8—output shaft 9.

The double transmission unit 5 is embodied as a worm drive, and the two transmission stages 6 and 7 are accordingly embodied as worm stages. The first transmission stage 6 comprises a shaft 10 and a worm gear 11 which is connected to the shaft 10 so as to rotate therewith. The first transmission stage 6 is also assigned the worm 4 on the armature shaft, wherein the worm 4 meshes with the worm gear 11. The shaft 10 is oriented orthogonally with respect to the armature shaft 3.

On the side facing away from the worm gear 11, the shaft 10 has a worm 12 which is arranged thereon so as to rotate therewith and which is part of the second transmission stage 7, which also comprises a shaft 13 and a worm gear 14 which is arranged on the shaft 13 so as to rotate therewith. The shaft 13 is arranged offset in parallel with the armature shaft 3 in the transmission casing 16 and is accommodated in a rotatably mounted fashion in a bearing 17. The worm gear 14 meshes with the worm 12 on the first shaft 10.

The worms 4 and 12 of the two worm stages 6 and 7, respectively, are preferably of multi-turn design and each have at least two turns, wherein embodiments with three, four or five or more turns can also be considered. The number of turns of the worms 4, 12 can differ or else be the same. The number of turns of at least two in each worm stage prevents self-locking of the transmission, with the result that in the event of failure of the drive motor a breakaway torque can be generated manually in order to move the vehicle component into the desired position.

On the side lying opposite the first transmission stage 6, the shaft 13 is coupled, via a pinion 15 arranged on the shaft 13 so as to rotate with it, to a spur gear 18 which is rotatably mounted in the transmission casing 16 and is driven by the pinion 15. The spur gear 18 represents an intermediate transmission stage which lies between the second transmission stage 7 of the double transmission unit 5 and the planetary gear mechanism 8 arranged downstream. The spur gear 18 is arranged coaxially with respect to the armature shaft 3. A further reduction in rotational speed with associated increase in torque is provided via the spur gear 18. The spur gear 18 is connected to a sun gear 19 of the planetary gear mechanism 8 so as to rotate with it, by means of which planetary gear mechanism 8 a further reduction in rotational speed is achieved. The sun gear 19 meshes with planetary gears 20 which are mounted on a planetary carrier 21 and are supported on the inner side of a ring gear 22 of the planetary gear mechanism 8. The planetary carrier 21 is connected to the output shaft 9 so as to rotate with it.

The output shaft 9 runs coaxially with respect to the armature shaft 3. The planetary gear mechanism 8 has a diameter d which exceeds the diameter of the drive motor 2. The double worm drive 5 has a radial extent which is greater than the diameter of the planetary gear mechanism 8; the radial protruding portion is characterized by a, wherein the protruding portion a only extends over a restricted angular segment. The radial protruding portion a of the double worm drive 5 is at maximum as large as half the diameter d of the planetary gear mechanism 8, but the protruding portion a is preferably no more than ¼ the diameter d.

The invention claimed is:

1. A drive device of a vehicle component, having an electric drive motor (2), an armature shaft (3) of which is connected to a transmission device for driving an output shaft (9), characterized in that the transmission device comprises at least one double transmission unit (5), including two transmission stages (6, 7) with two changes in direction and by means of which the transmission of the drive movement from the armature shaft (3) to the output shaft (9) can be deflected at two angles, characterized in that a further transmission stage (8) is arranged downstream of the double transmission unit (5), the further transmission stage (8) being a spur gear stage with a spur gear (18) to which a planetary gear (8) is connected, characterized in that the spur gear (18) of the spur gear stage is arranged between the double transmission unit (5) and the planetary gear mechanism (8), and characterized in that a sun gear (19) of the planetary gear mechanism (8) is connected in a rotationally fixed fashion to the spur gear (18), which meshes with a pinion (15) on a shaft (13) of a second transmission stage (7) of the double transmission unit (5).

2. The drive device as claimed in claim 1, characterized in that the output shaft (9) is parallel with respect to the armature shaft (3).

3. The drive device as claimed in claim 1, characterized in that each transmission stage (6, 7) comprises a 90° angular deflection.

4. The drive device as claimed in claim 1, characterized in that at least one transmission stage (6, 7) is a worm stage.

5. The drive device as claimed in claim 4, characterized in that the two transmission stages (6, 7) are worm stages.

6. The drive device as claimed in claim 5, characterized in that each worm stage comprises a shaft (10, 13) with a worm (4, 12) and a worm gear (11, 14), wherein the worm gear (11) of the first worm stage (6) meshes with a worm (4) on the armature shaft (3).

7. The drive device as claimed in claim 4, characterized in that the worm (4, 12) of the worm stage (6, 7) has at least two turns.

8. The drive device as claimed in claim 5, characterized in that the worms (4, 5) of the two worm stages (6, 7) each have at least two turns.

9. The drive device as claimed in claim 1, characterized in that a planetary gear carrier (21) which accommodates planetary gears (20) of the planetary gear mechanism (8) is connected in a rotationally fixed fashion to the output shaft (9).

10. The drive device as claimed in claim 1, characterized in that the double transmission unit (5) protrudes in a radial direction, transversely with respect to the armature shaft (3), over a cylindrical outer face of the downstream transmission stage (8), at maximum by an amount equal to the radius of the downstream transmission stage.

11. The drive device as claimed in claim 1, characterized in that the output shaft (9) is coaxial with respect to the armature shaft (3).

* * * * *

UNITED STATES PATENT AND TRADEMARK OFFICE
CERTIFICATE OF CORRECTION

PATENT NO.       : 8,585,124 B2                                             Page 1 of 1
APPLICATION NO. : 13/384290
DATED            : November 19, 2013
INVENTOR(S)      : Oberle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 44 days.

Signed and Sealed this
Twenty-second Day of September, 2015

Michelle K. Lee
*Director of the United States Patent and Trademark Office*